US010015207B2

(12) United States Patent
Karimli et al.

(10) Patent No.: US 10,015,207 B2
(45) Date of Patent: Jul. 3, 2018

(54) DYNAMIC RATE ADAPTATION DURING REAL-TIME LTE COMMUNICATION

(71) Applicant: T-Mobile USA, Inc., Bellevue, WA (US)

(72) Inventors: Yasmin Karimli, Kirkland, WA (US); Dinesh Arcot Kumar, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 503 days.

(21) Appl. No.: 14/520,621

(22) Filed: Oct. 22, 2014

(65) Prior Publication Data

US 2016/0119384 A1 Apr. 28, 2016

(51) Int. Cl.
| | |
|---|---|
| *H04L 29/06* | (2006.01) |
| *H04W 88/18* | (2009.01) |
| *H04L 1/00* | (2006.01) |
| *H04L 12/26* | (2006.01) |
| *H04W 84/04* | (2009.01) |

(52) U.S. Cl.
CPC ........ *H04L 65/1069* (2013.01); *H04L 1/0002* (2013.01); *H04L 1/0014* (2013.01); *H04L 43/08* (2013.01); *H04L 65/1083* (2013.01); *H04L 65/80* (2013.01); *H04W 88/181* (2013.01); *H04L 43/087* (2013.01); *H04L 43/0829* (2013.01); *H04L 43/0852* (2013.01); *H04W 84/042* (2013.01)

(58) Field of Classification Search
CPC ............... H04L 43/0829; H04L 43/087; H04L 65/1069; H04L 65/1083; H04L 65/80; H04W 88/181; H04W 84/042
See application file for complete search history.

(56) References Cited

U.S. PATENT DOCUMENTS

| | | | |
|---|---|---|---|
| 7,643,414 B1 | 1/2010 | Minhazuddin | |
| 2009/0190527 A1* | 7/2009 | Marinier | H04L 1/0002 370/328 |
| 2010/0172332 A1* | 7/2010 | Rao | H04L 65/602 370/338 |

(Continued)

FOREIGN PATENT DOCUMENTS

| | | |
|---|---|---|
| WO | WO2009088848 | 7/2009 |
| WO | WO2013112078 | 8/2013 |

OTHER PUBLICATIONS

PCT Search Report and Written Opinion dated Mar. 25, 2016 for PCT application No. PCT/US2015/055527, 11 pages.

(Continued)

*Primary Examiner* — Oussama Roudani
(74) *Attorney, Agent, or Firm* — Lee & Hayes, PLLC (57) ABSTRACT

Methods and computing systems for dynamic rate adaption during real-time Long Term Evolution (LTE) communication are described. A real-time LTE communication session with another mobile device is established over an LTE connection. The real-time LTE communication session is established with codec rate. A monitor component receives data indicating a performance of the real-time LTE communication session, and causes the real-time LTE communication component to perform, during the real-time LTE communication session, a renegotiation of the codec rate based at least on the performance of the real-time LTE communication session.

20 Claims, 6 Drawing Sheets

(56) References Cited

U.S. PATENT DOCUMENTS

| | | |
|---|---|---|
| 2013/0194937 A1 | 8/2013 | Sridhar et al. |
| 2013/0298170 A1 | 11/2013 | ElArabawy et al. |
| 2014/0067405 A1 | 3/2014 | Patel et al. |
| 2014/0105041 A1 | 4/2014 | Swaminathan et al. |
| 2014/0269269 A1 | 9/2014 | Kovvali et al. |
| 2014/0269373 A1 | 9/2014 | Nimmala et al. |
| 2014/0362832 A1* | 12/2014 | Rudolf .................. H04L 1/1822 370/336 |

OTHER PUBLICATIONS

The Extended European Search Report dated Apr. 17, 2018, for European Patent Application No. 15851996.7, 8 pages.

* cited by examiner

DYNAMIC RATE ADAPTATION DURING REAL-TIME LTE COMMUNICATION

BACKGROUND

In a Voice over LTE (VoLTE) call, voice service is provided as a data flow over a Long-Term Evolution (LTE) data bearer. During set up of a VoLTE call, the two user equipment (UE) device endpoints exchange capabilities in a negotiation mediated by an IP Multimedia Core Network Subsystem (IMS). In particular, the UEs exchange information regarding the codec and rates that they support, such as the AMR-WB (Adaptive Multi Rate Wide Band) codec rates that they support. AMR-WB is a speech audio coding standard that is codified as G.722.2, an ITU-T standard. AMR-WB operates on nine different bit rate modes, and in a typical call set-up, the UE devices exchange their bit rate modes and select the highest bit rate supported by both.

VoLTE utilizes Real-time Transport Protocol (RTP), which provides for voice (and video) transmission over Internet Protocol (IP) networks. RTP provides mechanisms for jitter compensation and detection of out-of-order arrival of data. Real-time control Protocol (RTCP) is used to exchange information regarding an RTP session.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The disclosure describes systems and mechanisms by which wireless UE devices renegotiate real-time, LTE-based communication session parameters, such as voice or video codec rates, during a real-time LTE communication session. The renegotiation is triggered by performance data. The performance data are influenced by network conditions, such as network edge conditions or end-to-end conditions, such as radio frequency (RF) conditions. The UE device includes a monitor component. In some examples, the monitor component monitors communications at one or more levels of a protocol stack, receives performance data, and determines whether to renegotiate a codec rate based on the performance data. The renegotiation is performed during the real-time LTE communication session. In some examples, the renegotiation is a streamlined renegotiation based on the UEs having previously exchanged their capabilities. A lower codec rate is more robust, and a higher codec rate provides better audio quality. Thus where performance is poor, lowering the codec rate enables the UE devices to better compensate for poor network conditions. Alternatively, where performance is good, switching to a higher codec rate takes advantage of good network conditions to provide improved service.

In some examples, the monitor component determines and monitors performance indicators regarding the real-time LTE communication session itself, such as jitter characteristics of the real-time LTE communication session, delay characteristics of the real-time LTE communication session, packet loss characteristics of the real-time LTE communication session, or other characteristics. Based on these performance indicators, the monitor component determines to perform an in-session renegotiation to a higher or lower codec rate during the session. For example, where performance indicators indicate poor performance (e.g., high jitter, high delay, high packet loss), the monitor component determines to renegotiate an in-call codec rate change to lower the codec rate. Where performance indicators indicate good performance, the monitor component determines to perform an in-call renegotiation to a higher codec rate. The renegotiation is initiated with a re-invite message.

In some examples, the monitor component determines and monitors performance at the edge of the network or poor RF condition. In some examples, the monitor component monitors physical conditions of an LTE connection with a base station. For example, the monitor component in some examples monitors, or receives from transmission hardware—such as from the modulator/demodulator (MODEM)—data regarding the physical conditions of the radio link. Such data includes for example signal-to-noise ratio (SNR), signal-to-interference-and-noise ratio (SINR), channel quality indicator (CQI), or other information. The monitor component determines in some examples to perform an in-session renegotiation of a codec rate change based on such conditions. For example, in high noise conditions, the monitor component determines to renegotiate an in-call codec rate change to lower the codec rate. In low noise conditions, the monitor component determines to renegotiate an in-call codec rate change to increase the codec rate.

In some examples, the monitor component monitors messages from the base station at the edge of the network and utilizes such messages as a type of performance data. In some examples, the monitor component receives data indicating that the base station—such as an enhanced Node B (eNB) in an LTE network—has transmitted an explicit request to establish a lower codec change. In another example, the monitor component receives data that indicates a Radio Resource Control (RRC) reconfiguration with a media access control (MAC) layer HARQ process change, where such reconfiguration indicates that the base station senses poor conditions. In response to such messages from the base station, the monitor component establishes a new or renegotiated codec rate for the real-time LTE communication session. In some examples, the reconfiguration of the MAC layer, such as a MAC layer HARQ process change for TTI bundling, includes an error correction or detection reconfiguration, such as from a less robust error correction or detection to a more robust error correction or detection. In one example, the error correction or detection reconfiguration includes sending multiple redundancy versions of data in a bundling—without waiting for an ACK or a NACK from the receiver, such as in Hybrid automatic repeat request (hybrid ARQ or HARQ) for Transmission Time Interval (TTI) bundling. A sender such as a base station may reconfigure the MAC link to utilize TTI bundling when conditions are poor, and monitor component may treat such reconfigurations as an edge network performance data.

As noted above, in some examples the base station transmits an explicit request to change a real-time LTE communication session codec rate. In some examples, the base station determines that the RF conditions for the UE reach a certain quality level—such as based on SNR or SINR or CQI—and submits a request to lower the real-time LTE communication session codec rate. In some examples, the base station monitors utilization levels of the base station. In response to high utilization or congestion levels, the base station may request that one or more UEs connected to the base station reduce their codec rates in order to reduce the overall utilization rate of the base station. In these examples, the base station is provided with some control over the codec rate used by the UE for a real-time LTE communication session, such as a VoLTE call.

As used herein, a real-time LTE communication session is a type of electronic communication in which at least jitter and delay adversely affect the utility of the communication from a human point of view and which are specifically designed to be carried natively over an LTE communication. Packet loss may also adversely affect a real-time LTE communication—although packet loss may be less important to the human perception of the communication than either jitter or delay. Examples of real-time LTE communication sessions include telephone calls, such as VoLTE calls and video calls, such as ViLTE (video over LTE) calls. Other examples may include or be part of streaming video, streaming audio, multi-party audio conferences, multi-party video conferences, online gaming sessions, and so forth. Embodiments are not limited to any one type of types of real-time LTE communication sessions.

Overview

Figure 1:
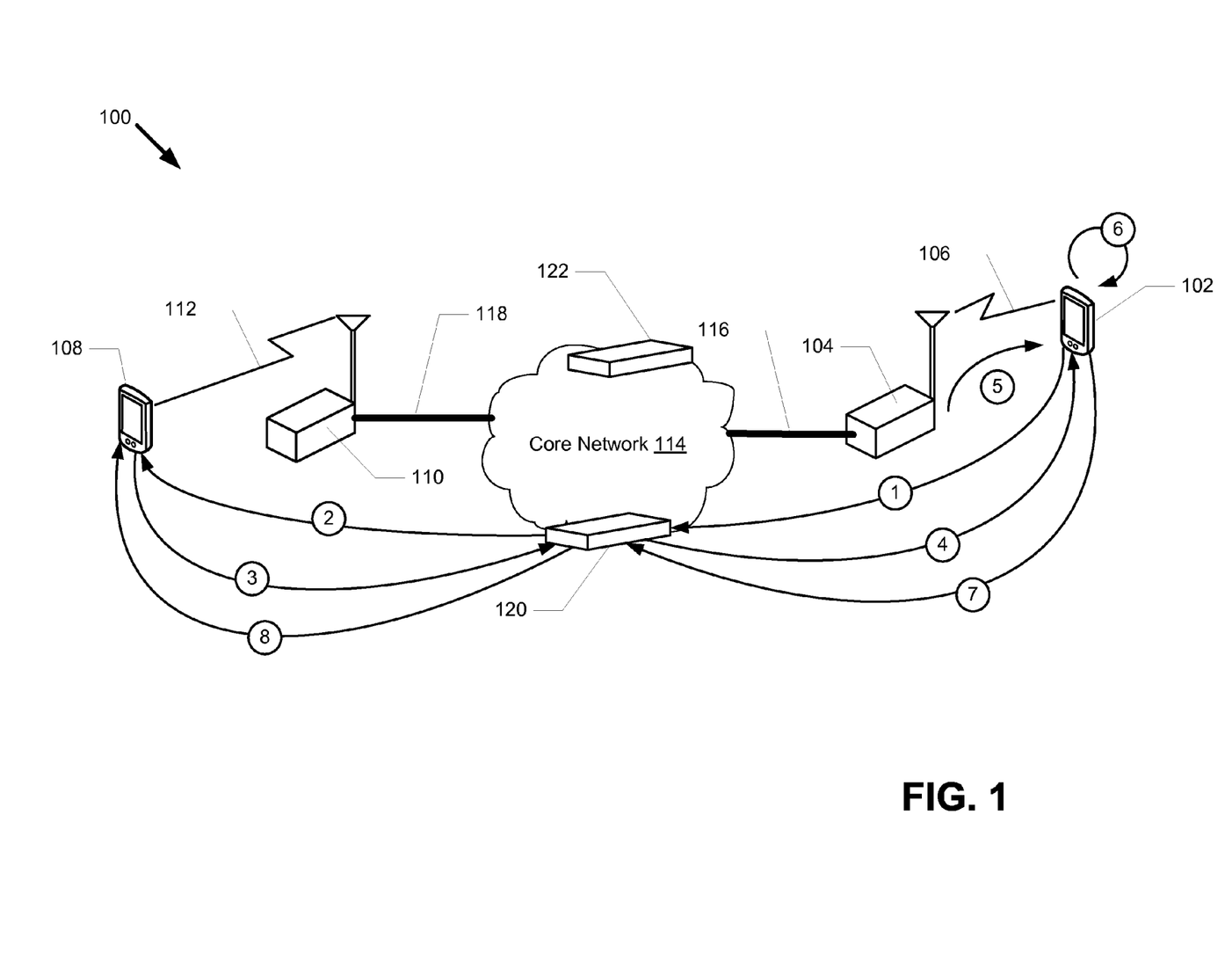
FIG. 1 illustrates an example environment in which a codec rate is adapted during a VoLTE session.

FIG. 1 illustrates an example environment 100 in which a codec rate is adapted during a VoLTE session. First user Equipment (UE) 102 is coupled to a first base station 104 via a first LTE connection 106. Similarly, second UE 108 is coupled to a second base station 110 via a second LTE connection 112.

The first UE 102 and the second UE 108 are, in some embodiments, LTE-compliant devices. That is, they are compliant with the LTE standards, e.g., those promulgated by the 3rd Generation Partnership Project (3GPP) in the Release 8 and Release 9 document series, as well as one or more future releases that may be promulgated. In some embodiments, one or both of the first UE 102 and the second UE 108 is a mobile device, such as a mobile phone, tablet computer, laptop computer, handheld game console, media player, personal data assistant, or other mobile device. In some embodiments, one or both of the first UE 102 and the second UE 108 is a stationary device, such as a desktop computer, game console, server, television, or other stationary device. The first UE 102 is not limited to any type or types of devices.

The first base station 104 and the second base station 110 are, in some embodiments, compliant with the LTE standards, i.e., those promulgated by the 3GPP in the Release 8 and Release 9 document series, as well as one or more future releases that may be promulgated. Such base stations are referred to as an enhanced Node B ("eNodeB," or "eNB").

The first base station 104 is coupled to a core network 114 via a first network connection 116, and the second base station 110 is coupled to the core network 114 via a second network connection 118. The core network 114 may include an Evolved packet core (EPC), an IMS core, or one or more other network architectural components configured to route Internet Protocol (IP) or other data packets, as well as a circuit switched core, configured to route and carry circuit-switched voice calls.

An Internet Protocol Multimedia Subsystem (IMS) and EPC core 120 is involved in establishing real-time LTE communication between the first UE 102 and the second UE 108. The real-time LTE communication is, in some embodiments, a VoLTE call between the first UE 102 and the second UE 108. In some embodiments, the real-time LTE communication may be a video over LTE call, streaming video, streaming audio, multi-party audio conference, multi-party video conference, an online gaming session, and so forth.

During communication establishment (including for example an Invite message), such as during a VoLTE call establishment, the first UE 102 provides the IMS core 120 and the second UE 108 (called phone) with a list of capabilities (marked with a circled "1" in FIG. 1). The capabilities include one or more codecs and rates, such as AMR-WB bit rate modes, AMR-NB (narrow band) codec and bit rate modes and EVS (Enhanced voice service) codec and bit rate modes, all or some of which may be supported by the first UE 102. AMR-WB/NB and EVS bit rate modes indicate a codec rate for the real-time LTE communication session. The IMS core 120 provides the invite to the UE 108 (marked with circled "2" in FIG. 1). Based on the capabilities and information provided by the first UE 102, the second UE 108 responds back with the highest common codec and rate supported by both UE 108, and the network (marked with a circled "3" in FIG. 1). The capability data also include one or more codecs, such as one or more AMR-WB/NB and EVS bit rate modes supported by the second UE 108.

Upon receiving each other's capability data (marked with circled "4" in FIG. 1), the first UE 102 and the second UE 108 establish a real-time LTE communication session, such as for example a VoLTE call, with one another. Establishing the real-time LTE communication session includes establishing a codec rate, such as in conjunction with establishing an AMR-WB bit rate mode. In one example, the first UE 102 and the second UE 108 establish the real-time LTE communication session using the highest bit rate mode that both support. In another example, the first UE 102 and the second UE 108 establish the real-time LTE communication session based on one or more network conditions, such as are described in more detail below. The first UE 102 stores the capabilities of the second UE 108 in memory, and the second UE 108 stores the capabilities of the first UE 102 in memory, in order to streamline a renegotiation and reconfiguration of the codec rate as described in more detail below.

The following description of the reconfiguration and renegotiation of a codec rate describes the process being triggered by the first UE 102 and/or the first base station 104. But the process may also be triggered by the second UE 108 and/or the second base station 110. In some embodiments, one of the first UE 102 or second UE 108 includes a monitor component as described herein. In some embodiments, both the first UE 102 and the second UE 108 includes a monitor component.

In some embodiments, the first base station 104 monitors radio conditions associated with the first LTE connection 106. Such conditions include one or more of signal-to-noise ratio (SNR), signal-to-interference-plus-noise ratio (SINR), Channel Quality Indicator (CQI) or other conditions. In some embodiments, the first base station 104 monitors a utilization level at the first base station 104. A utilization level includes a number of active connections, such as LTE connections, between UEs and the first base station 104, and also available network resources like a physical resource block (PRB).

Responsive to determining that conditions are poor, such as determining that a radio condition falls below a certain threshold, such as a certain SINR, SNR, or CQI threshold, the first base station 104 may take one or more actions. The first base station 104 transmits a message to the first UE 102 that indicates poor network conditions (marked with a circled "5" in FIG. 1). In some embodiments, the message is a request, command, or instruction from the first base station 104 to reduce a codec rate, or otherwise alter the bit rate of the established real-time LTE communication session already established between the first UE 102 and the second UE 108. In some embodiments, the message indicates a MAC layer reconfiguration, such as an RRC connection reconfiguration with MAC layer HARQ process change for TTI bundling that indicates poor radio conditions. A MAC layer HARQ process change for TTI bundling includes in some embodiments, an error correction and/or error detection reconfiguration, such as for example a transition from a less-robust error correction to a more-robust error correction, such as a transition to Hybrid automatic repeat request (HARQ) process change for Transmission Time Interval (TTI) bundling.

For example, the MAC layer may be initially configured to utilize Incremental Redundancy HARQ. In Incremental Redundancy HARQ, each time the first UE 102 receives erroneous data, it does not discard it. Instead, it negatively acknowledges receipt of the data and the first base station 104 retransmits it. In each retransmission, the first base station 104 retransmits with a different set of coded bits. With each redundancy version, the first UE 102 has an incrementally improved chance of successfully correcting and/or decoding the data. In TTI bundling, the first UE 102 transmits up to four redundancy versions (the same data with different sets of coded bits) sequentially without first waiting for the first base station to transmit a negative acknowledgment or a positive acknowledgement (ACK). In very poor radio conditions, where retransmission of data is frequent, TTI bundling reduces the amount of retransmission delay, thereby improving overall service quality. Thus, receipt of a message indicating HARQ TTI bundling reconfiguration indicates to the first UE 102 that the radio quality has dropped below a certain threshold.

The first base station 104 takes one or more steps to determine which UE or UEs to request to reduce their codec rates. In some embodiments, such as where the first base station 104 determines to reduce codec rates responsive to congestion or high utilization of the first base station 104, the first base station 104 identifies one or more UEs that utilize a relatively high codec rate, and transmits to those one or more UEs message(s) including a request, command, or instruction to lower the codec rate. The UE then sends a re-invite to do a session description protocol (SDP) negotiation. The base station includes a database with codec rate of all the active UEs having a current VoLTE call. This information is provided by the UE to the base station after the SDP negotiation is completed. This way, the base station knows the codec rate of all the active UEs connected to the base station with VoLTE calls in the network.

The first UE 102 includes a monitor component that monitors the performance of the real-time LTE communication session. The first UE 102 receives data that indicates the performance. For example, as noted above, the data received by the first UE 102 includes, in some embodiments, a message from the first base station 104, where the message includes an explicit request to reduce a codec rate and/or a reconfiguration message that indicates worsening radio conditions. The data may be an indication, such as from transmission hardware of the first UE 102, which indicates that there is a MAC layer reconfiguration, such as an RRC connection reconfiguration with MAC HARQ process change, as discussed above.

The data may include one or more data packets associated with the real-time LTE communications session, such as data packets whose payloads include communications data (e.g., audio and/or video data). The data packets may include control packets from the second UE 108, which indicate various conditions experienced on the second UE 108. In some embodiments, the data packets include Real Time Protocol (RTP) data packets. In some embodiments, the data packets include Real Time Control Protocol (RTCP) packets. RTP is described in Request for Comments (RFC) 3550 published by the Internet Engineering Task Force (IETF). It provides for voice and video transmission over IP networks. It also provides mechanisms for jitter compensation and detection of out-of-order arrival of data. RTP is a data transfer protocol, and its data packets include timestamp information, sequence numbers, and other information that can be used to determine performance of the real-time LTE communication. RTCP is used to exchange information regarding the RTP session between the communicating endpoints.

From the one or more data packets, the first UE determines one or more performance indicators of the real-time LTE communication session. The one or more performance indicators include one or more of packet jitter (variances in the inter-packet arrival times), packet delay, packet loss ratios or percentages, or other information. These performance indicators are determined, in some embodiments, from RTP packets directly, or from RTCP packets received from the second UE 108.

In some embodiments, the data includes indication, such as from the transmission hardware of the first UE 102, of radio conditions on the first LTE connection 106. Such conditions include one or more of signal-to-noise ratio (SNR), signal-to-interference-plus-noise ratio (SINR), Channel quality indicator (CQI) or other conditions.

The first UE 102 determines, from one or more data—e.g., explicit requests, instructions, or commands to change a codec level, data indicating a MAC layer reconfiguration, such as an RRC connection reconfiguration indicating a MAC HARQ process change, one or more data packets of the real-time LTE communication session (e.g., RTP packets), one or more control packets (e.g., RTCP packets), radio condition data, and so forth—to change a codec rate for the real-time LTE communication session (marked as a circled "6" in FIG. 1). The first UE 102 transmits a re-invite request to the IMS core 120 requesting that the codec rate be changed (marked as a circled "7" in FIG. 1) and the IMS core forwards the reinvite request to the second UE 108 (marked as a circled "8" in FIG. 1).

In some embodiments, the first UE 102 determines to lower the codec rate based on the received data. In some embodiments, an algorithm is utilized to determine whether to change the codec rate, such as based on thresholds being reached, such as threshold SINR, threshold SNR, threshold CQI, threshold jitter, threshold delay, threshold packet loss, and so forth. In other embodiments, a metric is determined, which may be based on a weighted sum of one or more of SNR, SINR, CQI, jitter, delay, packet loss, and so forth. The metric may be recalculated at intervals and upon the metric exceeding, meeting, and/or falling below a threshold, the first UE 102 determines to change the codec rate for the real-time LTE communication session.

In some embodiments, the first UE 102 treats some data as sufficient to change the codec rate (such as for example an explicit request from the first base station 104 to change the codec rate), while other data is not treated as individually sufficient to change the codec rate. In one particular example, the first UE 102 treats messages from the first base station 104 explicitly requesting a codec rate change and/or messages from the first base station 104 indicating a MAC layer reconfiguration, such as an RRC connection reconfiguration with MAC HARQ process change as sufficient to trigger a rate change, while inputting other data (e.g., SNR, SINR, CQI, jitter, delay, packet loss, etc.) into an algorithm (e.g., a weighted sum or other algorithm) to determine a metric. In some embodiments, the first UE 102 may be configured to receive only one or some of the above-described data to determine to change the metric. In some embodiments, the second UE 108 may be configured to utilize different types of data than the first UE 102 to determine whether to change a codec rate. Embodiments are not limited to any one type or types of monitor components or data subsets used to determine to make a codec rate change.

In some embodiments, the first UE 102 utilizes a timer to determine whether to change a codec rate. For example, the first UE 102 may wait a certain amount of time after a first codec rate change before requesting or initiating another codec rate change. This may prevent the codec rate from being changed often, due to unusual conditions that cause high network performance variability. Use of a timer may reduce resource utilization used to change the codec rates, and prevent undesired user perception of varying service quality. In some embodiments, the first UE 102 utilizes a first timer to determine whether to increase a codec rate, and a second timer—or no timer—to determine whether to decrease a codec rate. This may, such as where the first timer is a longer duration the second timer, enable rapid response to worsening performance, while preventing the codec rate from being increased during times of high network performance variability.

In some embodiments, the first UE 102 and the second UE 108 exchange capability data after the first UE 102 requests a codec rate change. In some embodiments, the first UE 102 selects a known codec rate from previously stored capability information of the second UE 108 and includes the selected codec rate in the reconfiguration request. In some embodiments, the first UE 102 transmits a message that indicates to drop the codec rate to a next-lowest codec rate supported by both the first UE 102 and the second UE 108. In some embodiments, the first UE 102 transmits a message that indicates to drop the codec rate to a lowest supported rate supported by both the first UE 102 and the second UE 108. Where both the first UE 102 and the second UE 108 store each others' capabilities received during establishment of the real-time LTE communication session, the reconfiguration request messages may not include an explicit reconfiguration codec rate. Embodiments are not limited to any type or types of reconfiguration protocols.

Reporting Performance Data to IMS Core

The monitor component in the first UE 102 is configured, in some embodiments, to periodically report performance data to a monitoring key performance indicator (KPI) server 122. The performance data includes one or more of erroneous checksum data (e.g., numbers of packets received with bad checksum), packet loss data, packet jitter data, packet delay data, radio conditions (e.g., SINR, SNR, or other), MAC reconfiguration data, and so forth along with time stamp and cell identifiers. The reporting may occur in a batch, and it may occur at a time of low network utilization, such as in the early morning hours or other low network utilization time. KPI server 122 may collect data from a plurality of UEs and provide information to network engineers regarding the overall performance of mobile connections, including the quality of real-time LTE communication sessions on the network as experience by the plurality of UEs.

Example User Equipment

Figure 2:
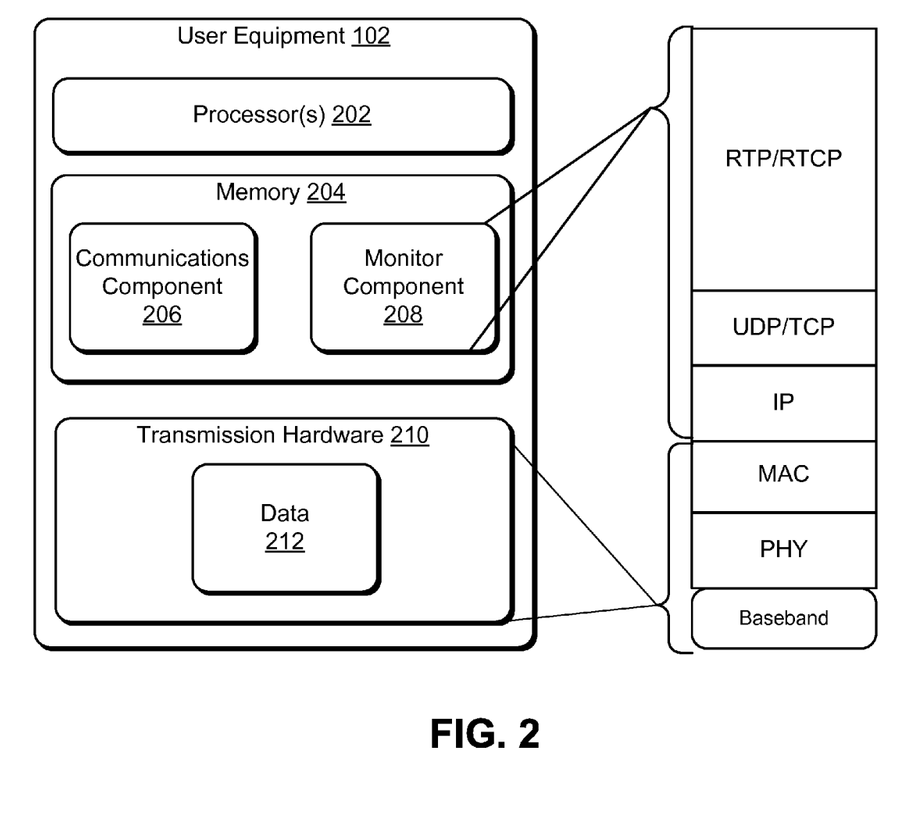
FIG. 2 illustrates an example User Equipment.

FIG. 2 illustrates an example User Equipment 102. As illustrated in FIG. 2, the first UE 102 includes processor(s) 202 and memory 204. In some embodiments, the processor(s) 202 is a central processing unit (CPU), a graphics processing unit (GPU), or both CPU and GPU, or any other sort of processing unit. Each of the one or more processor(s) 202 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 202 may also be responsible for executing all computer applications stored in the memory 204, which can be associated with common types of volatile (RAM) and/or nonvolatile (ROM) memory.

In various embodiments, memory 204 may include system memory, which may be volatile (such as RAM), nonvolatile (such as ROM, flash memory, etc.) or some combination of the two. The memory 204 may also include additional data storage devices (removable and/or non-removable) such as, for example, magnetic disks, optical disks, or tape.

Memory 204 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the first UE 102. Any such non-transitory computer-readable media may be part of the first UE 102.

The memory 204 includes a communications component 206 that is executable by the processor(s) 202 to establish a real-time LTE communication session with another mobile device (such as the second UE 108) over a Long Term Evolution (LTE) connection or other connection. Establishment of the real-time LTE communication session, including establishing a codec rate for the real-time LTE communication session, is discussed elsewhere within this detailed description.

The memory 204 includes a monitor component 208 that is executable by the processor(s) 202 to receive data indicating a performance of the real-time LTE communication session. The monitor component 208 causes the communication component 206 to perform, during the real-time LTE communication session, a renegotiation of the codec rate based at least on the performance of the real-time LTE communication session. As discussed elsewhere within this Detailed Description, the data includes one or more of e.g., explicit requests, instructions, or commands to change a codec level, data indicating a MAC layer reconfiguration (e.g., TTI bundling), one or more data packets of the real-time LTE communication session (e.g., RTP packets), one or more control packets (e.g., RTCP packets), radio condition data (e.g., SNR, SINR, or other), and so forth.

The first UE 102 includes transmission hardware 210. The transmission hardware 210 includes one or more processors, chips, application specific integrated circuits (ASICs), programmable circuit (e.g., field programmable gate arrays), firmware components, and so forth that establish an LTE connection with a base station, transmit data, and monitor the LTE connection. The transmission hardware 210 includes one or more of a modem, a receiver, a transmitter, an antenna, error correction units, symbol coders and decoders, and so forth.

As illustrated in FIG. 2, the transmission hardware 210 handles transmissions and protocol exchanges on the baseband (e.g., a physical LTE connection) as well as the physical (PHY) and media access control (MAC) layers of a protocol stack. The transmission hardware 210 monitors conditions at these layers, and in the baseband, including reconfigurations that occur in these layers, such as MAC layer reconfigurations as described elsewhere within this Detailed Description, as well as radio conditions such as SINR, SNR, and so forth. The transmission hardware 210 stores data 212 associated with reconfigurations and/or radio conditions and makes data 212 available to the monitor component 208.

In the example illustrated in FIG. 2, the monitor component 208 monitors communications and protocol exchanges at higher layers of the protocol stack, such as IP communications, User Datagram Protocol (UDP) communications, Transmission Control Protocol (TCP) communications, RTP/RTCP communications, and so forth.

The delineation of protocol stack monitoring illustrated in FIG. 2 may differ in various embodiments; the protocol stack monitoring is shown in FIG. 2 for illustration only.

The second UE 108, illustrated in FIG. 1, may be the same as or similar to the first UE 102 illustrated in FIG. 2.

Example Base Station

Figure 3:
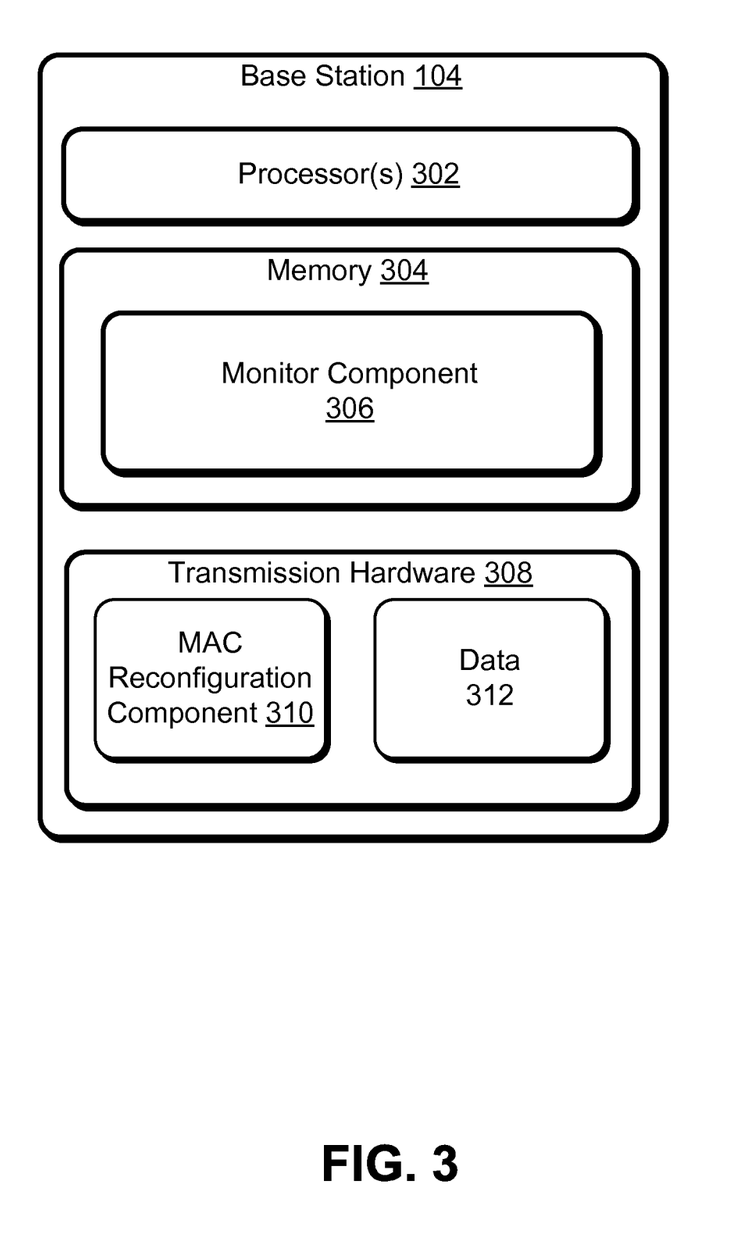
FIG. 3 illustrates an example base station.

FIG. 3 illustrates an example first base station 104. As illustrated in FIG. 3, the first base station 104 includes processor(s) 302 and memory 304. In some embodiments, the processor(s) 302 is a central processing unit (CPU), a graphics processing unit (GPU), or both CPU and GPU, or any other sort of processing unit. Each of the one or more processor(s) 302 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 302 may also be responsible for executing all computer applications stored in the memory 304, which can be associated with common types of volatile (RAM) and/or nonvolatile (ROM) memory.

In various embodiments, memory 304 may include system memory, which may be volatile (such as RAM), nonvolatile (such as ROM, flash memory, etc.) or some combination of the two. The memory 304 may also include additional data storage devices (removable and/or non-removable) such as, for example, magnetic disks, optical disks, or tape.

Memory 304 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the first base station 104. Any such non-transitory computer-readable media may be part of the first base station 104.

The memory 304 includes a monitor component 306 that monitors one or more conditions of the first base station 104, such as utilization levels of the first base station 104, radio conditions of the first base station 104, and so forth. The monitor component 306 is executable by the processor(s) 302 to determine that the conditions of the first base station 104 indicate to request that one or more UEs, such as the first UE 102, change a codec rate. The monitor component 306 determines, in some embodiments, that the utilization level (e.g., the number of active LTE connections supported by the first base station 104 at any one time) meets or exceeds a certain threshold. In some embodiments, the monitor component 306 determines that radio conditions (e.g., SINR, SNR, or other) for one or more LTE connections falls below or reaches a certain minimum threshold. Based on one or more of these conditions, the monitor component 306 selects one or more UEs to receive a message including a command, request, or instruction, to change a codec rate. For example, where an LTE connection with a particular UE has a SINR or SNR that falls below a certain threshold, the monitor component 306 transmits a message to a monitor component (such as the monitor component 208) to the particular UE to request a codec rate change.

The first base station 104 includes transmission hardware 308. The transmission hardware 308 includes one or more processors, chips, application specific integrated circuits (ASICs), programmable circuit (e.g., field programmable gate arrays), firmware components, and so forth that establish an LTE connection with a plurality of UEs, transmit data, and monitor the LTE connections. The transmission hardware 308 includes one or more modems, receivers, transmitters, antennas, error correction units, symbol coders and decoders, and so forth.

The transmission hardware 308 handles transmissions and protocol exchanges on the baseband (e.g., the physical LTE connection) as well as the physical (PHY) and media access control (MAC) layers of a protocol stack. The transmission hardware 308 monitors conditions at these layers, and in the baseband, including radio conditions such as SINR, SNR, and so forth. The transmission hardware 308 includes a MAC reconfiguration component 310 that causes a MAC layer reconfiguration in response to radio conditions of a particular LTE connection. Such MAC layer reconfiguration includes in some embodiments, an error correction and/or error detection reconfiguration, such as for example a transition to a Hybrid automatic repeat request (HARQ) Transmission Time Interval (TTI) bundling.

The transmission hardware 308 stores data 312 associated with radio conditions and makes data 312 available to the monitor component 306.

The base station 110, illustrated in FIG. 1, may be the same as or similar to the first base station 104 illustrated in FIG. 3.

Figure 4:
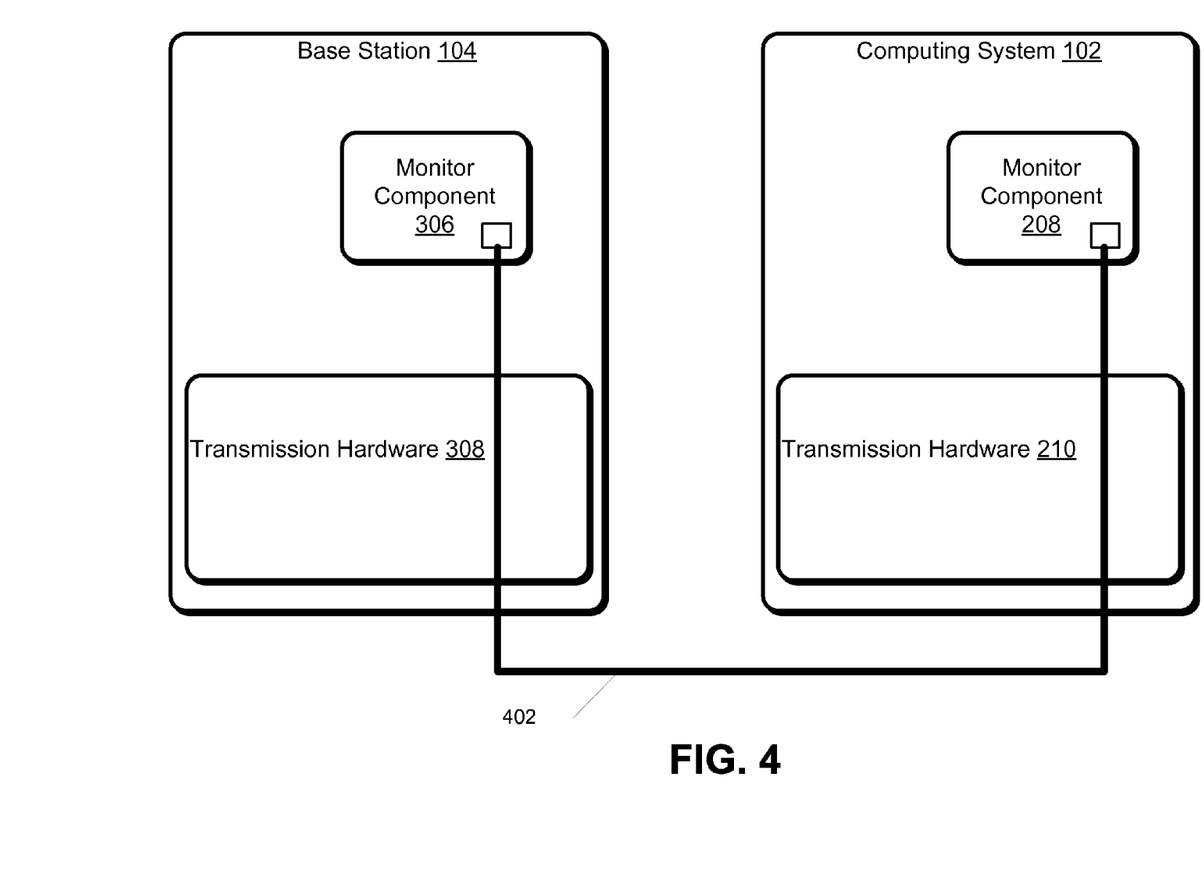
FIG. 4 illustrates a connection between the monitor component of the first base station and the monitor component of the first UE.

FIG. 4 illustrates a connection between the monitor component 306 of the first base station 104 and the monitor component 208 of the first UE 102. The monitor component 306 and the monitor component 208 are configured to exchange control messages, such as codec configuration requests, via a control connection 402. The control connection 402 is, in some embodiments, an IP based connection, such as a TCP/IP or UDP/IP connection. The control connection 402 may be an LTE control message or extension. The transmission hardware 308 and the transmission hardware 210 may be involved in causing the change request messages to be transmitted. In some embodiments, the monitor component 306 causes the transmission hardware 308 to transmit an LTE control message with the codec change request, instruction, or command to the transmission hardware 210, which then makes the control message available to the monitor component 208. In some embodiments, the monitor component 208 is configured to periodically poll, or cause the transmission hardware 210, to poll the monitor component 306 or the transmission hardware 308 for control messages.

Example Processes

Figure 5:
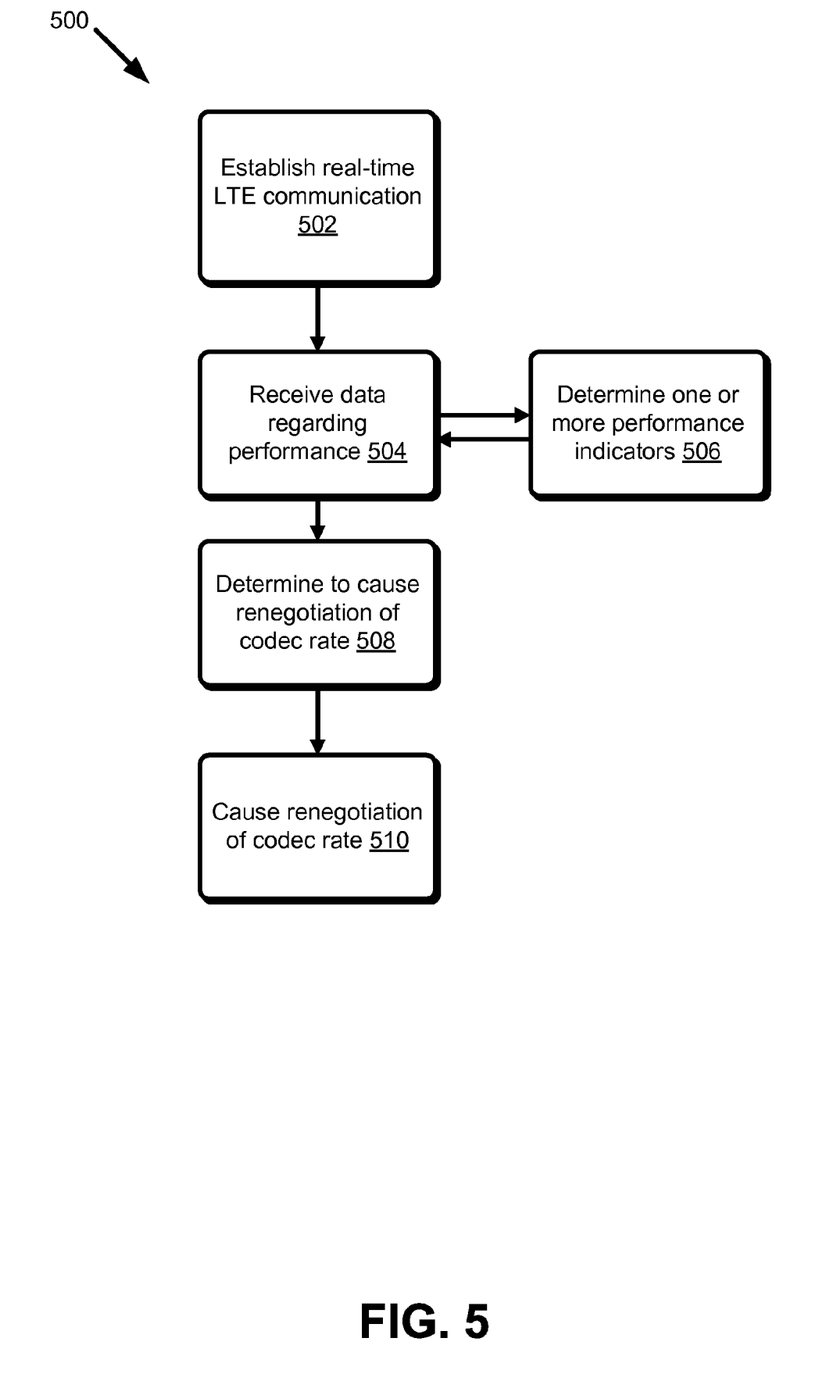
FIG. 5 illustrates a flow chart of an example process of dynamic rate adaptation during a real-time LTE communication session.
Figure 6:
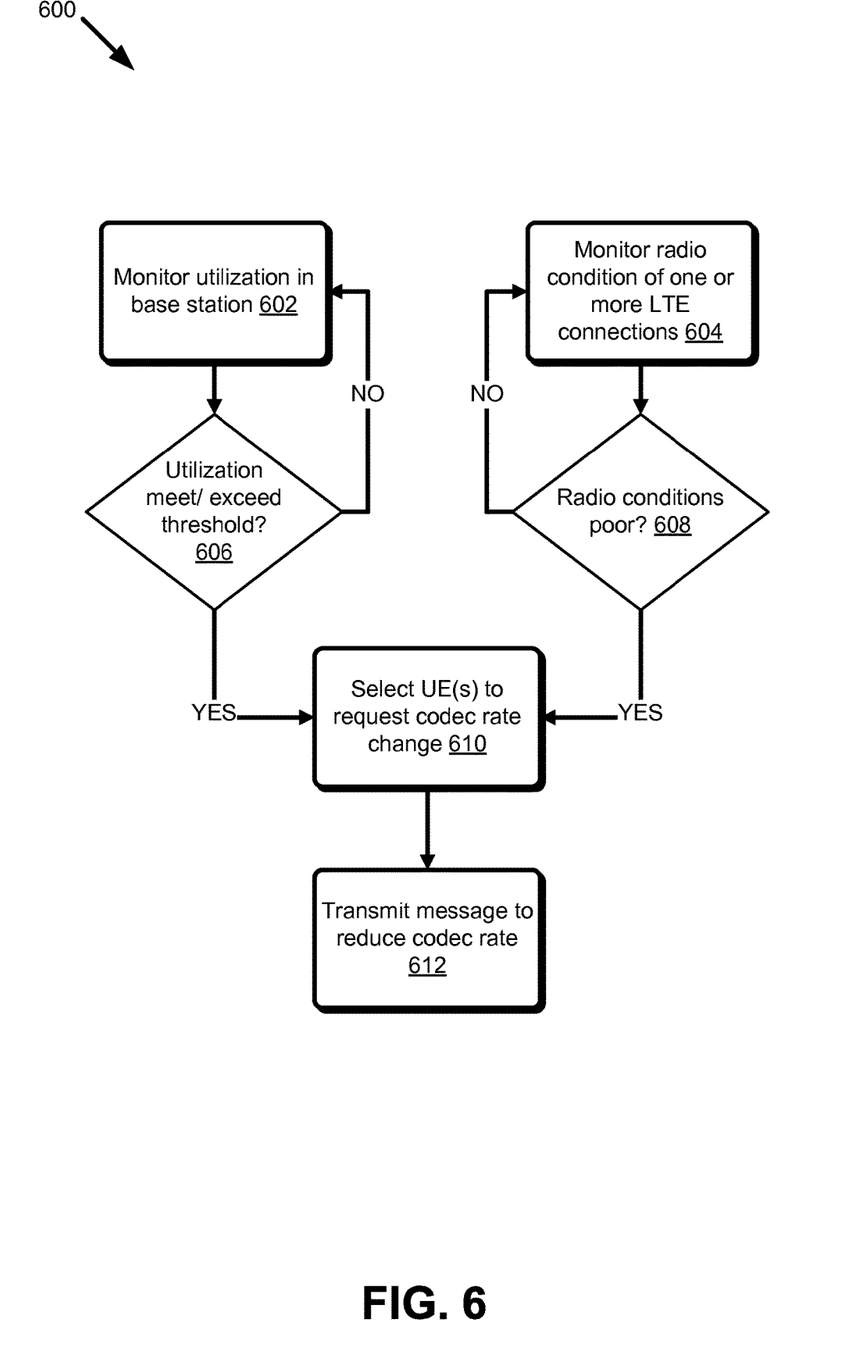
FIG. 6 illustrates a flow chart of an example process of a base station requesting a UE dynamic codec rate change.

FIGS. 5 and 6 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates a flow chart of an example process 500 of dynamic rate adaptation during a real-time LTE communication session. At 502, a communications component of a UE, such as the communications component 206 of the first UE 102, establishes via a wireless connection, such as a Long Term Evolution (LTE) connection, a real-time LTE communication connection between the mobile device and another mobile device. A codec rate is also established as part of the communication connection establishment. The real-time LTE communication connection includes, in some embodiments, telephone calls (such as a VoLTE call), video calls, streaming video, streaming audio, multi-party audio conferences, multi-party video conferences, online gaming sessions, and so forth. The codec rate is also established as part of the real-time LTE communication session establishment. Capabilities of the UEs are exchanged as part of the establishment. The capabilities include one or more AMR-WB bit rate modes supported by the UEs. Such modes indicate a codec rate for the real-time LTE communication session.

At 504, a monitor component, such as the monitor component 208, receives data indicating a performance of the real-time LTE communication connection. This occurs during the session. The data includes, in various embodiments, one or messages from the base station (e.g., explicit messages including a request, command, or instruction to change a codec rate; a message including a reconfiguration, such as a MAC layer reconfiguration, such as from a less robust to a more robust error correction, e.g., a HARQ TTI bundling configuration, etc.), one or more data packets that include real-time LTE session payload data (e.g., RTP packets), control packets (e.g., RTCP packets), radio condition data, such as SNR, SINR, and so forth.

In some embodiments, at 506, the monitor component determines at least one performance indicator associated with the real-time LTE communication connection. In some embodiments, the at least one performance indicator includes packet jitter data, packet delay data, packet loss data, or other. The at least one performance indicator may be based on one or more one or more data packets that include real-time LTE session payload data (e.g., RTP packets), control packets (e.g., RTCP packets), or other.

At 508, the monitor component determines to cause the mobile device to renegotiate the codec rate based at least on the received data In some embodiments, the determination is based on one or more of at least one performance indicator, a message from the base station including an explicit request, instruction, or command to change a codec rate, a reconfiguration message from the base station (e.g., a MAC layer reconfiguration, error correction/detection reconfiguration, HARQ TTI indication, or other), radio condition data such as SNR or SINR, and so forth. In some embodiments, the monitor component utilizes one or more data as input into an algorithm, such as a weighted sum to produce a metric, which is then compared to one or more thresholds to determine whether to raise or lower the codec rate. In some embodiments, the monitor component looks at one, or more than one, type of data. In some embodiments, a one or more timers are utilized to set a time period between codec rate changes. In some embodiments, the monitor component treats one or more types of data as sufficient to change the codec, such as messages from the base station indicating HARQ TTI bundling or explicit request, instruction, or command to change a codec rate. Other processes for determining to cause thee codec rate change are made without departing from the scope of embodiments.

At 510, the monitor component causes the mobile device to renegotiate the codec rate based at least on the data. In some embodiments, the monitor component instructs the communications component to request a codec rate change. In some embodiments, the codec rate change involves an exchange of capabilities, and a selection of a new codec rate, such as a lower codec rate that is supported by both UEs. In other embodiments, a streamlined codec renegotiation involves selecting a codec rate from a list of previously provided capabilities exchanged during the initial setup of the real-time LTE communication session. In some embodiments, an IMS core, such as the IMS core 120, selects the new codec rate based on a request from the communications component (or other component of the UE) to establish a lower or higher codec rate. Once established, the UEs continue the real-time LTE communication session using the new codec rate.

FIG. 6 illustrates a flow chart of an example process 600 of a base station requesting a UE dynamic codec rate change. At 602, a monitor component of a base station, such as the monitor component 306 of the first base station 104, monitors a utilization level of the base station. Utilization levels include, in some embodiments, a number of active LTE connections, a number of active real-time LTE multimedia communication sessions, a number of active VoLTE connections, a number of active ViLTE connections, a data throughput of the base station, and so forth.

At 604, the monitor component monitors the radio conditions of one or more wireless connections (such as LTE connections) of the base station. In some embodiments, the radio conditions include an SNR, an SINR, or other radio condition.

At 606, the monitor component determines whether the utilization level of the base station indicates to change a codec rate. In some embodiments, the monitor component determines whether one or more utilization levels meets or exceeds a threshold, such as a threshold number of active LTE connections, threshold number of VoLTE connections, threshold number of bits per second, and so forth. In some embodiments, the utilization level may be a utilization level over a period of time, such as over a second, a minute, an hour, a day, and forth. Examples of such utilization levels include an average utilization over the time period, a lowest utilization level over the time period, a maximum utilization level over the time period, a standard deviation of the utilization over a time period, and so forth. In some embodiments, the utilization level may be an instantaneous utilization level.

At 608, the monitor component determines whether the radio conditions are poor. In embodiments, the monitor component determines whether the radio conditions are poor based on the radio conditions dropping below a certain threshold, such as a certain SNR or SINR threshold, or other threshold. The monitor component may determine whether the radio conditions exceed the threshold instantaneously, or over a certain period of time.

At 610, upon determining that conditions are poor or that base station utilization indicates to change a codec rate, the monitor component determines one or more UEs to lower their codec rates. Where radio conditions are poor, the monitor component determines to lower the codec rates for those UEs that have poor radio conditions. Where utilization is high, the monitor component determines to lower the codec rates of those UEs that currently utilize high codec rates, or that currently have good quality radio conditions, on the assumption that a lower codec rate would not overly impact the real-time LTE communication sessions of those UEs with good radio conditions and/or high codec rates.

At 612, the monitor component causes the selected UEs to lower their codec rates. The monitor component, in some embodiments, causes a message to be sent to the selected UEs, the messages including a command, instruction, or request to lower the codec rate.

After base station utilization conditions or radio conditions improve, the monitor component in some embodiments causes another message to be sent to the selected UEs indicating that codec rates are permitted to be increased. In some embodiments, the UEs are configured to attempt to increase the codec rates after a period of time passes after lowering their codec rates in response to a message from the base station.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A mobile device, comprising:
at least one processor;
a memory coupled to the processor;
a real-time Long Term Evolution (LTE) communication component stored by the memory and executable by the at least one processor to establish a real-time LTE communication session with a second mobile device over a LTE connection by:
  transmitting a first list of codec rates supported by the mobile device to the second mobile device;
  receiving a second list of codec rates supported by the second mobile device; and
  establishing a codec rate for the real-time LTE communication session that is included in both the first list and the second list; and
a monitor component stored by the memory and executable by the at least one processor to:
  receive a message from a base station that indicates poor network conditions via a media access control (MAC) reconfiguration that includes a change to an error correction or error detection configuration; and
  cause the real-time LTE communication component to perform, in response to the message and during the real-time LTE communication session, a renegotiation of the codec rate by transmitting a request to the second mobile device that the codec rate be changed to a different codec rate included in both the first list and the second list.

2. The mobile device of claim 1, wherein the real-time LTE communication session is a Voice over LTE (VoLTE) connection.

3. The mobile device of claim 1, wherein the monitor component is further executable to:
analyze one or more data packets of the real-time LTE communication session and determine, from the one or more data packets, at least one performance indicator associated with the real-time LTE communication session; and
determine the different codec rate based at least on the at least one performance indicator.

4. The mobile device of claim 3, wherein the at least one performance indicator includes one or more of packet jitter information, packet delay information, or packet loss information.

5. The mobile device of claim 1, wherein the MAC reconfiguration includes a change from a less robust to a more robust error correction or error detection configuration.

6. The mobile device of claim 1, wherein the MAC reconfiguration includes a change to Hybrid automatic repeat request (HARQ) Transmission Time Interval (TTI) bundling.

7. A method, comprising:
transmitting, by a first mobile device to a second mobile device, a first list of codec rates supported by the first mobile device;
receiving, by the first mobile device from the second mobile device, a second list of codec rates supported by the second mobile device;
establishing a real-time Long Term Evolution (LTE) communication connection between the first mobile device and the second mobile device at a codec rate included in both the first list and the second list;
receiving, by a monitor component of the first mobile device, a message from a base station that indicates poor network conditions via a media access control (MAC) layer message indicating a MAC layer reconfiguration including a change to Hybrid automatic repeat request (HARQ) Transmission Time Interval (TTI) bundling;

causing the first mobile device to, in response to the message and during the real-time LTE communication connection, renegotiate the codec rate by transmitting a request to the second mobile device that the codec rate be changed to a different codec rate included in both the first list and the second list.

8. The method of claim 7, wherein the real-time LTE communication connection is a Voice over LTE (VoLTE) connection.

9. The method of claim 7, further comprising:
analyzing one or more data packets of the real-time LTE communication connection and determining, from the one or more data packets, at least one performance indicator associated with the real-time LTE communication connection; and
determining the different codec rate based at least on the at least one performance indicator.

10. The method of claim 9, wherein the at least one performance indicator includes at least one of jitter information, delay information, or packet loss information for the real-time LTE communication connection.

11. The method of claim 7, wherein the MAC reconfiguration includes a change to an error correction or error detection configuration.

12. The method of claim 7, wherein the MAC reconfiguration includes a change from a less robust to a more robust error correction or error detection configuration.

13. One or more non-transitory computer-readable media including instructions executable by at least one processor of a computing device to cause the computing device to:
transmit, to a second computing device, a first list of codec rates supported by the computing device;
receiving, from the second computing device, a second list of codec rates supported by the second computing device;
establish, via a Long Term Evolution (LTE) connection, a Voice Over LTE (VoLTE) connection to the second computing device, the VoLTE connection having a codec rate included in both the first list and the second list;
monitor one or more communications received by the computing device;
receive a message from a base station that indicates poor network conditions through a MAC layer error correction configuration that includes a change from a less robust to a more robust error correction or error detection configuration;
cause the computing device, in response to the message and during the VoLTE connection, to renegotiate the codec rate for the VoLTE connection by transmitting a request to the second computing device that the codec rate be changed to a different codec rate included in both the first list and the second list.

14. The one or more non-transitory computer-readable media of claim 13, wherein the instructions are further executable by the at least one processor of the computing device to:
analyze a plurality of packets of the VoLTE connection and determine, from the plurality of packets of the VoLTE connection, at least one performance indicator including one or more of a packet jitter, a packet delay, or a packet data; and
determine the different codec rate based at least on the at least one performance indicator.

15. The mobile device of claim 1, wherein the request indicates that the different codec rate is the next lowest codec rate included in both the first list and the second list relative to the codec rate.

16. The mobile device of claim 1, wherein the request indicates that the different codec rate is the lowest codec rate included in both the first list and the second list.

17. The method of claim 7, wherein the request indicates that the different codec rate is the next lowest codec rate included in both the first list and the second list relative to the codec rate.

18. The method of claim 7, wherein the request indicates that the different codec rate is the lowest codec rate included in both the first list and the second list.

19. The one or more non-transitory computer-readable media of claim 13, wherein the request indicates that the different codec rate is the next lowest codec rate included in both the first list and the second list relative to the codec rate.

20. The one or more non-transitory computer-readable media of claim 13, wherein the request indicates that the different codec rate is the lowest codec rate included in both the first list and the second list.

* * * * *